United States Patent [19]

Hsu et al.

[11] Patent Number: 5,754,395
[45] Date of Patent: May 19, 1998

[54] ERGONOMIC KEYBOARD FOR A PORTABLE COMPUTER WHICH IS MOVEABLE BETWEEN TWO POSITIONS

[75] Inventors: Richard T. Hsu, San Jose, Calif.; Stewart Hsu; Phillips Tsai, both of Taipei, Taiwan

[73] Assignee: Acer Advanced Labs, Inc., San Jose, Calif.

[21] Appl. No.: 521,531

[22] Filed: Aug. 29, 1995

[51] Int. Cl.⁶ .................. G06F 1/16; B41J 11/56; H05K 5/02
[52] U.S. Cl. .................................. 361/680; 400/682
[58] Field of Search ..................... 361/680, 681; 364/708.1; 341/22; 400/488, 489, 682, 681, 691; G06F 1/16

[56] References Cited

U.S. PATENT DOCUMENTS

| | | | |
|---|---|---|---|
| 4,509,873 | 4/1985 | Ryan | 400/489 |
| 4,773,783 | 9/1988 | Dickie. | |
| 4,830,525 | 5/1989 | Nagashima et al.. | |
| 4,980,676 | 12/1990 | Nomura et al.. | |
| 5,168,427 | 12/1992 | Clancy et al.. | |
| 5,297,003 | 3/1994 | Nomura et al.. | |
| 5,347,424 | 9/1994 | Akahane. | |
| 5,426,449 | 6/1995 | Danziger. | |
| 5,490,036 | 2/1996 | Lin et al. | 361/680 |
| 5,532,904 | 7/1996 | Sellers | 361/680 |
| 5,534,891 | 7/1996 | Takano | 361/680 |
| 5,539,615 | 7/1996 | Sellers | 361/680 |

FOREIGN PATENT DOCUMENTS 3-10307  1/1991  Japan ................... 361/680

OTHER PUBLICATIONS

Frank, E. H. et al., "Adjustable Keyboard Mechanism", *IBM Technical Disclosure Bulletin*, 25:4, Sep. 1982, pp. 1978–1979.

Frank, E. H. et al., "Adjustable Keyboard", *IBM Technical Disclosure Bulletin*, 27:1A, Jun. 1984, pp. 153–154.

Author not given, "Access method for Feature Expansion", *IBM Technical Disclosure Bulletin*, 29:8, Jan. 1987, pp. 3491–3492.

Author not given, "Keyboard Set-In Mechanism for Transportable Computer", *IBM Tech. Discl. Bulletin*, 32:9A, Feb. 1990, pp. 56–57.

*Primary Examiner*—Lynn D. Feild
*Attorney, Agent, or Firm*—Townsend and Townsend and Crew LLP

[57] ABSTRACT

An apparatus and method for providing a portable computer keyboard (6) with a forward and downward slope. The device and method include a linkage assembly (8) for automatically moving the keyboard into an inclined position when the display module (22) of the computer is opened into its operating configuration. The linkage assembly is further adapted to automatically move the keyboard into a substantially parallel orientation relative to the computer housing (10) when the display module is closed into the carrying or carrying configuration. A disabling mechanism (80) is coupled to the linkage assembly for preventing the linkage from moving the keyboard between the carrying and operating positions as the display module is opened and closed.

23 Claims, 7 Drawing Sheets

# ERGONOMIC KEYBOARD FOR A PORTABLE COMPUTER WHICH IS MOVEABLE BETWEEN TWO POSITIONS

BACKGROUND OF THE INVENTION

The present invention relates generally to personal computers and more particularly to ergonomically designed keyboards for portable computers, such as laptop or notebook computers.

Conventional horizontal keyboards require the operator to position his/her hands in an unnatural angle when operating the keyboard. Frequent use of these horizontal keyboards can result in injuries because the operator's arms and hand muscles are typically operating outside their natural and ideal range. Tendons, muscles and nerves are adversely affected and this abuse can, over time, lead to repetitive stress injuries, such as tendinitis or carpal tunnel syndrome. For example, an operator of a conventional horizontal keyboard often types with straight wrists, which generally requires greater muscle and tendon effort than if the wrists were bent. The harder the muscles and tendons are exerted, the more likely they will become overworked, which increases the possibility that repetitive stress injuries may occur.

To minimize repetitive stress injuries, most desktop computers are now configured so that the keyboard slopes downwardly toward the user of the computer. This downward keyboard slope positions each distally successive key row at a slightly higher elevation than that of the preceding key row to improve user hand and wrist orientation during keyboard use. To further increase the downward slope of the keyboard, conventional desktop keyboards typically include recessed, pivotable support legs on the rear underside portion of the keyboard housing. The support legs can be locked into a downward position, where they support the distal portion of the keyboard at an even higher elevation.

Unfortunately, the above measures for improving the ergonomics of desktop keyboards have not been quite as successful with portable computers, i.e., laptop or notebook computers. One of the reasons for this lack of success is that a critical design criteria for laptop computers is size. In particular, it is generally considered advantageous to minimize the thickness of the laptop computer in its closed or carrying configuration so that the laptop will easily fit within a carrying bag, such as a briefcase. Accordingly, the simple expedient of sloping the bottom side of the computer to correspondingly slope the keyboard during use is typically not employed because this would increase the thickness of the computer in its closed configuration.

Another reason conventional methods for inclining desktop keyboards are generally not applicable to laptop computers is that, as the name implies, laptop computers are often operated on an uneven surface, e.g., the user's lap, on a hotel bed, airplane tray rests, etc. Therefore, it is not particularly desirable to provide the underside of the computer with downwardly pivotable rear support legs because these support legs would tend to reduce the overall stability of the computer during use. Moreover, the support legs may not provide a suitable, ergonomically sloped keyboard when the computer is resting on an uneven surface.

What is needed, therefore, are devices and methods for improving the ergonomics of portable computers. In particular, these devices and methods should be capable of inclining the portable computer keyboard to place the user's hands in a more natural position during operation of the keyboard without appreciably increasing the overall exterior dimensions of the computer or decreasing its support stability during use.

SUMMARY OF THE INVENTION

The present invention is directed to a device and method for tilting a portable computer keyboard to improve user hand and wrist orientation during keyboard use. To this end, the device and method provide the computer keyboard with a downwardly sloped, more natural, orientation when the display monitor of the computer is opened. In addition, the device and method of the invention are capable of automatically moving the keyboard into a substantially parallel orientation relative to the computer housing when the display monitor is closed.

The device of the present invention comprises a portable computer including a main housing for holding a central processing unit and a lid for carrying a display panel. The lid is pivotally mounted to the housing for movement between open and closed positions. The main housing defines a recess for receiving a keyboard and a lower support surface. A linkage assembly is coupled between the lid and the keyboard for moving the keyboard between a storage or carrying position, where the keyboard is substantially parallel to the support surface, and an operating position, where the keyboard slopes downwardly towards the support surface. In this manner, the keyboard can be moved between an ergonomically, sloped configuration during use and a conventional horizontal configuration during storage or transit.

One advantage of the present invention is that the keyboard can be easily moved into the conventional horizontal configuration so that it does not appreciably increase the thickness of the portable computer during storage or transit. In addition, the linkage assembly is internally disposed within the portable computer and the movements of the keyboard are entirely internal, i.e., they do not change the outer shape of the computer housing. Therefore, the present invention will not diminish the stability of the main housing when the computer is placed on uneven support surfaces, such as the user's lap.

Another advantage of the invention is that the linkage assembly is responsive to movement of the lid to automatically move the keyboard into the operating position as the lid is opened and to automatically move the keyboard into the carrying position as the lid is closed. The operator simply opens and closes the lid and the keyboard will automatically pivot into the operating and carrying positions.

In a specific embodiment, the lid is pivotally coupled to the main housing via a hinge. The linkage comprises a cam attached to the hinge for rotation therewith and a lever pivotally coupled to the main chassis about a pivot pin. The lever includes a pair of arms having camming surfaces for engaging the rotating cam and the bottom of the keyboard, respectively. As the lid is opened, the cam rotates with the hinge, thereby engaging one of the arms and pivoting the lever about the pivot pin. The other arm then elevates the distal end of the keyboard to incline or tilt the keyboard relative to the hand support surface.

The invention further includes a disabling mechanism for preventing the linkage assembly from moving the keyboard between the operating and carrying positions as the lid is opened and closed. In a specific embodiment, the disabling mechanism includes an external knob coupled to the lever for sliding the lever into and out of engagement with the cam. The keyboard is preferably biased into the carrying position so that the lid will readily close even when the linkage assembly is disabled.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE SPECIFIC EMBODIMENTS

Figure 1:
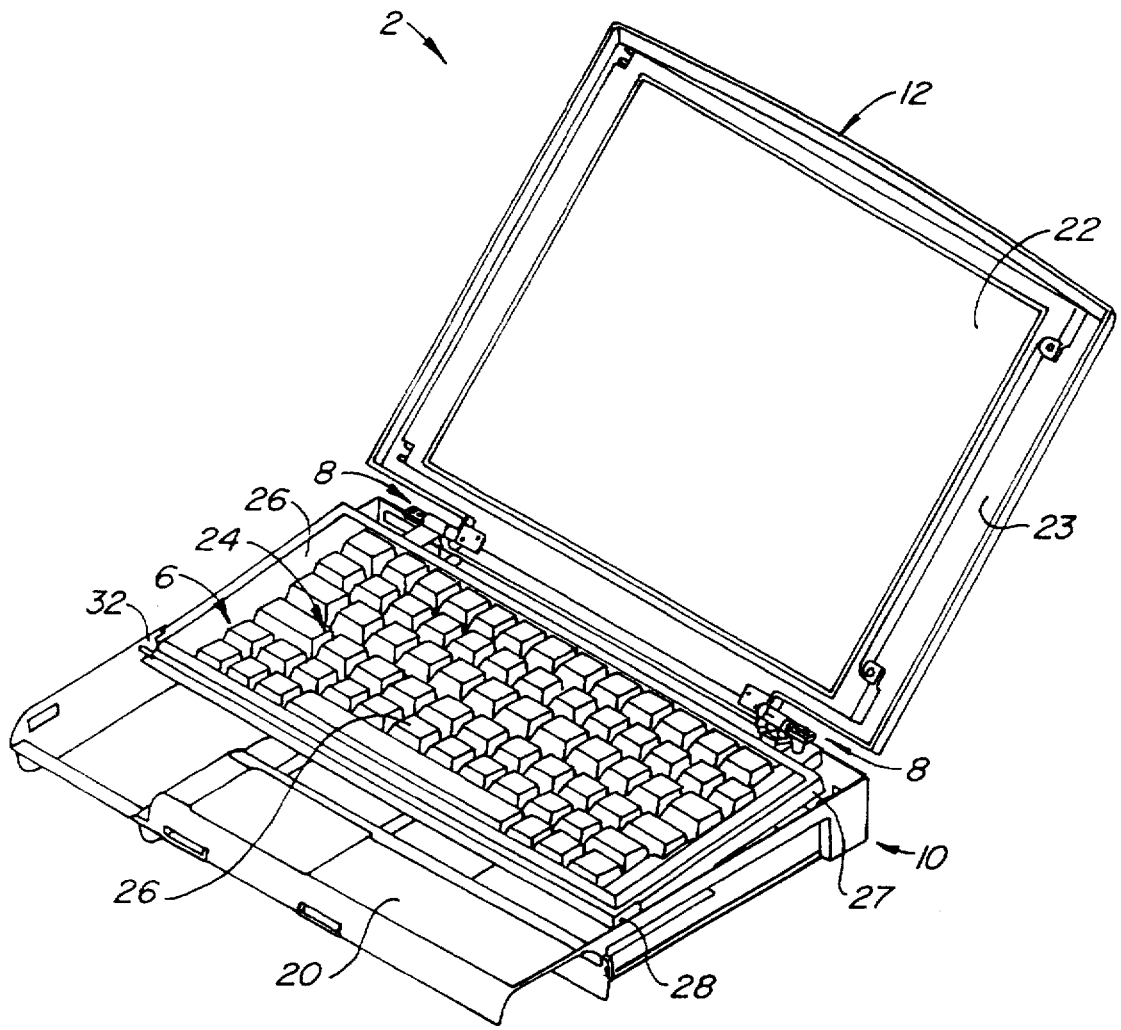
FIG. 1 is a perspective view of a representative portable computer incorporating a tiltable keyboard according to the present invention.

Referring to the drawings in detail, wherein like numerals indicate like elements, a representative portable computer 2 incorporates a keyboard 6 and a linkage assembly 8 for inclining keyboard 6 according to the principles of the present invention. Computer 2 generally includes a base housing 10 and a rectangular lid 12 conventionally secured to a rear wall 14 of housing 10 for pivoting lid 12 between its illustrated upright open position and a lowered closed position (not shown).

Figure 2:
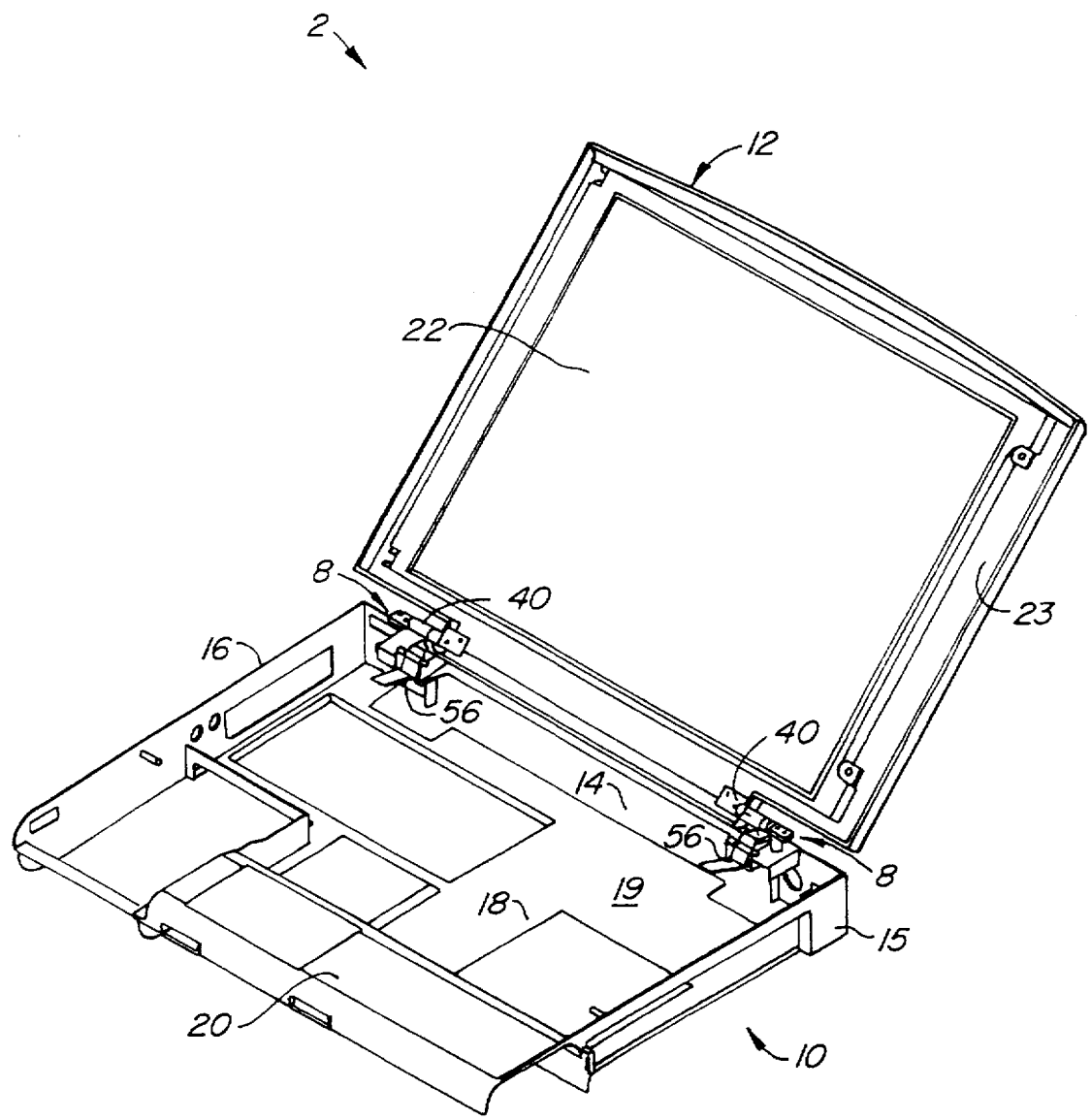
FIG. 2 is a perspective view of the portable computer of FIG. 1 without the keyboard, illustrating a linkage assembly for tilting the keyboard.

Referring to FIGS. 1 and 2, base housing 10 includes left and right sidewalls 15, 16 and a bottom wall 18 adapted to rest upon a suitable surface, e.g., a desk, the user's lap, etc. Housing 10 further defines a hollow 19 for housing keyboard 6 between rear wall 14 and left and right sidewalls 15, 16 and a proximal hand support surface 20 for supporting the user's hands during operation of keyboard 6. Housing 10 will also include a central processing unit (not shown) and other conventional features, such as an internal floppy disk drive, etc. Lid 12 carries a display panel having a screen portion 22 extending across a front side 23 of lid 12 and visible to the computer user when the lid is in its upright open position. Lid 12 further includes a latch (not shown) for latching lid 12 in the lowered closed position. Lid 12 and base housing 10 are each formed in one integral piece from a molded plastic material, as is conventional in the art.

With reference to FIG. 1, keyboard 6 is received within hollow 19 of housing 10 and includes a plurality of keys 24, a touchpad/trackball (not shown) and other conventional input devices suitably mounted atop a rectangular metal carrier plate 26. Keyboard 6 is pivotally coupled to base housing 10 for movement between a carrying position (not shown), where keyboard 6 is substantially parallel to hand support surface 20, and an operating position (FIG. 1), where keyboard 6 is inclined forwardly and downwardly relative to support surface 20. Keyboard 6 preferably includes springs 148 (see FIG. 10) for biasing distal end 27 of keyboard 6 into the carrying position. As shown in FIG. 1, the proximal or front corners of carrier plate 26 are provided with upstanding tabs 28. Tabs 28 have circular openings that rotatably receive inwardly projecting pins 32 molded on the inner surfaces of the base housing sidewalls 15, 16. This permits keyboard 6 to be pivoted about a horizontal axis parallel to rear wall 14 of housing 10 between its operating and carrying positions. Of course, it will be recognized by those skilled in the art that other types of pivot structures can be used, such as a rod extending through carrier plate 26.

Referring to FIG. 2, linkage assembly 8 is coupled to lid 12 and housing 10 for pivoting keyboard 6 between the carrying and operating positions. Preferably, keyboard 6 will be inclined at an angle of 5 to 12 degrees relative to hand support surface 20, and more preferably, 8 to 10 degrees in the operating position. Housing 10 may optionally include a controller (not shown) for manually setting the angle of inclination. Linkage assembly 8 is responsive to movement of lid 12 to automatically pivot keyboard 6 into the operating position when lid 12 is opened, as is shown in FIG. 1, and to automatically pivot keyboard 6 into the carrying position when lid 12 is closed. However, linkage assembly 8 can also be configured for manual operation by the user, if desired.

Figure 3:
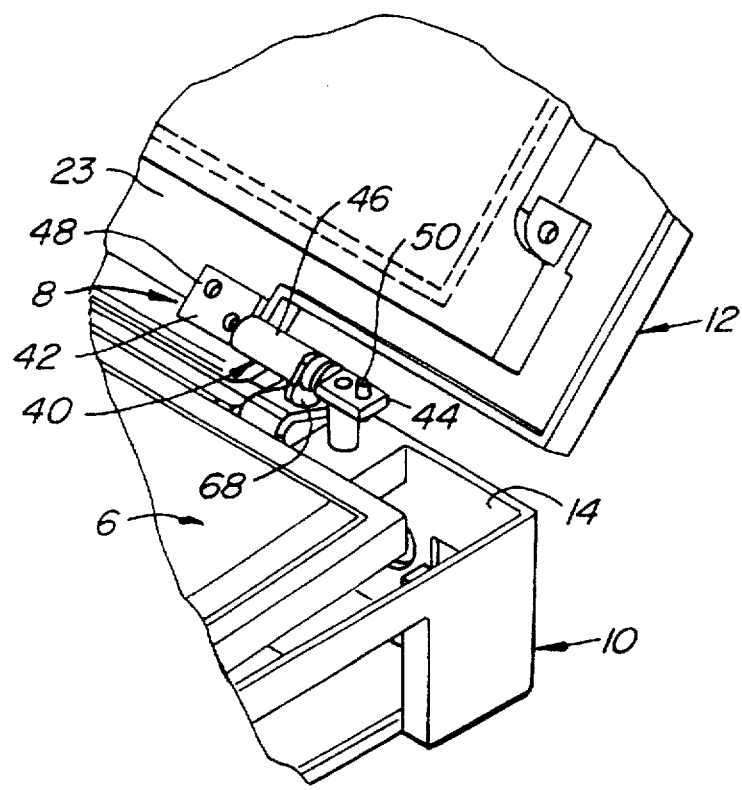
FIG. 3 is an enlarged view of the linkage assembly of FIG. 2, illustrating the keyboard in a tilted or inclined position relative to the bottom surface of the computer.
Figure 4:
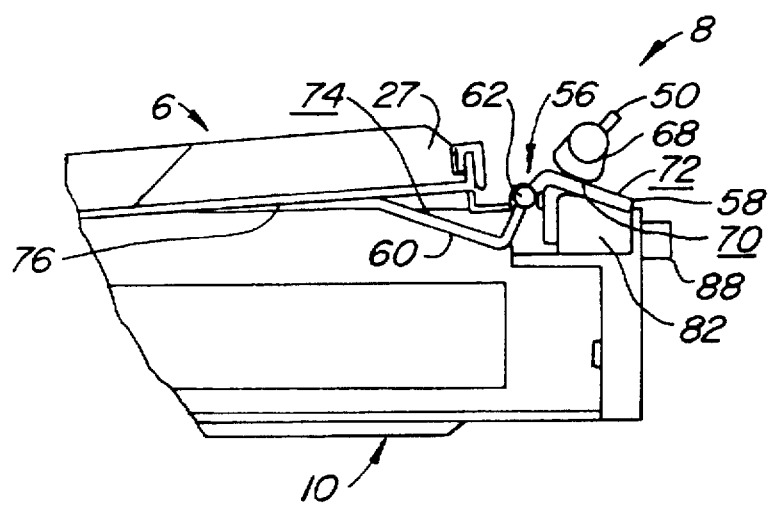
FIG. 4 is a side view of the linkage assembly.
Figure 5:
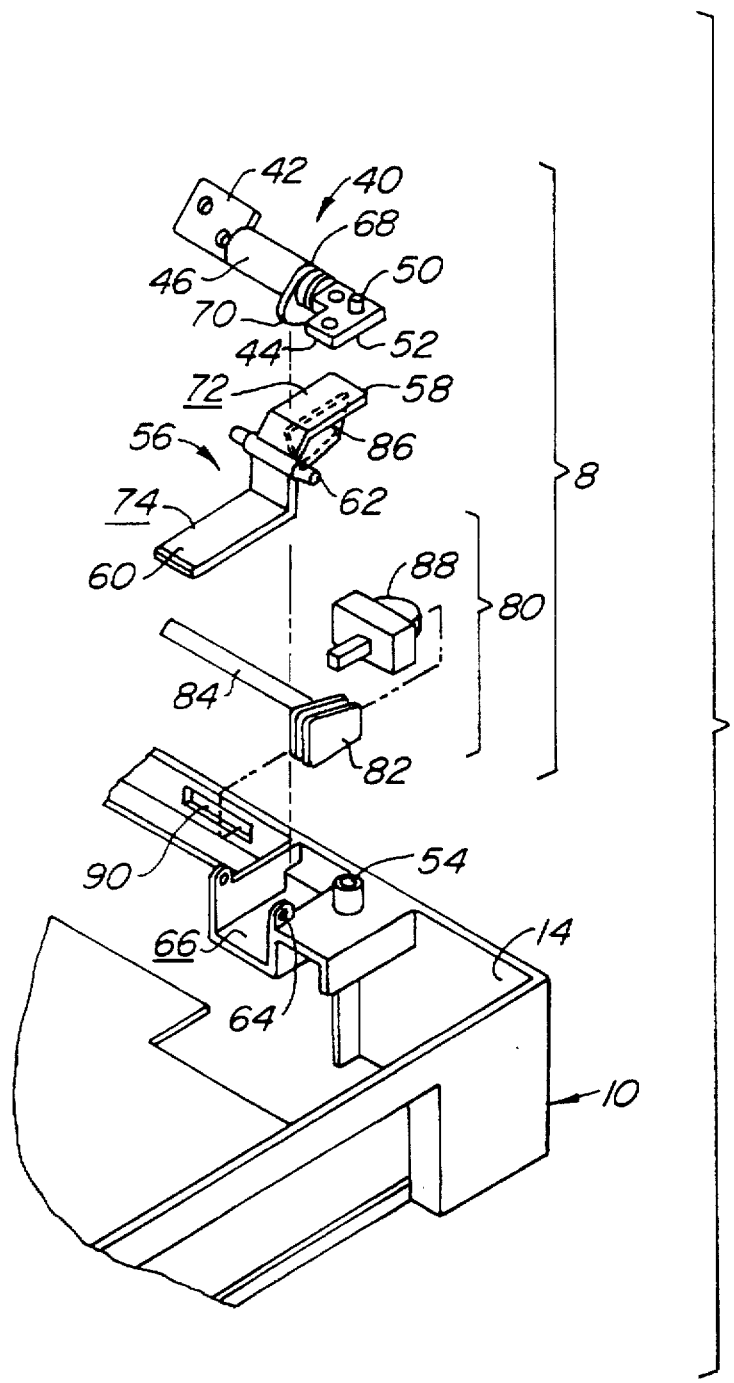
FIG. 5 is an exploded view of the linkage assembly and a disabling mechanism for preventing the linkage assembly from tilting the keyboard.

FIGS. 2–5 illustrate a specific embodiment of linkage assembly 8. In this embodiment, linkage assembly 8 comprises a pair of hinges 40 on opposing ends of lid 12 for pivotally coupling the lid to base housing 10. As best shown in FIG. 3, each hinge 40 comprises a hinge housing 42 fixed to lid 12, a shaft adapter 44 fixed to housing 10 and a tubular member 46 therebetween. Hinge housing 42 is a generally rectangular plate having holes 48 for receiving screws (not shown) to thereby attach hinge housing 42 to front panel 23 of lid 12. As shown in FIG. 5, shaft adapter 44 has a downwardly extending protrusion 52 that cooperates with a hole 54 in housing 10 to attach hinge 40 to housing 10. Hinge 40 preferably comprises a clutch 50 interposed between hinge housing and shaft adapter 42, 44 for limiting the rotational movement of lid 12 to minimize any damage that the user may cause by opening or closing lid 12 too quickly.

Referring again to FIG. 2, linkage assembly 8 further includes a pair of levers 56 pivotally coupled to opposite ends of housing 10. Levers 56 each cooperate with one of the hinges 40 to pivot keyboard 6 when lid 12 is opened and closed. As shown in FIG. 5, each lever 56 comprises first and second arms 58, 60 linked by a pivot pin 62 therebetween. Pivot pin 62 is rotatably mounted to seats 64 within a recess 66 of housing 10 for allowing rotation of arms 58, 60 about the pin axis. Each hinge 40 includes a cam 68 fixed to tubular member 46 for rotation therewith as lid 12 is opened or closed. Cam 68 defines a rounded surface 70 for engaging a camming surface 72 on first arm 58 of lever 56 as cam 68 is rotated. As shown in FIG. 4, second arm 60 of lever 56 also includes a camming surface 74 positioned to engage a lower surface 76 of keyboard 6. Cam 68 engages camming surface 72 to rotate lever 56 about pin 62, thereby causing camming surface 74 to engage lower surface 76 and lift distal end 27 of keyboard 6 away from bottom wall 18 of housing 10.

Figure 6:
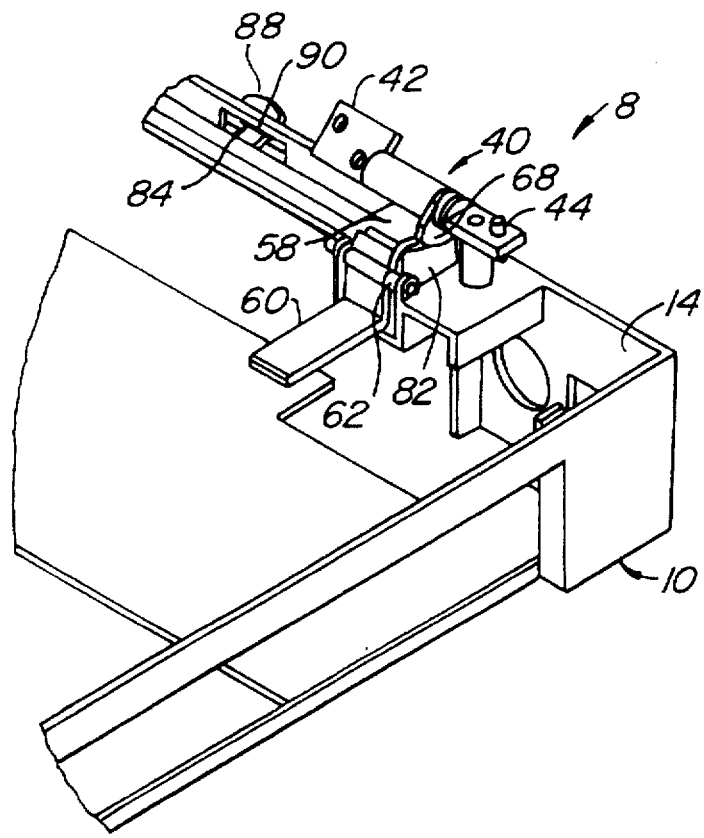
FIG. 6 is a partial view of the computer of FIG. 1 in the disabled position.
Figure 7:
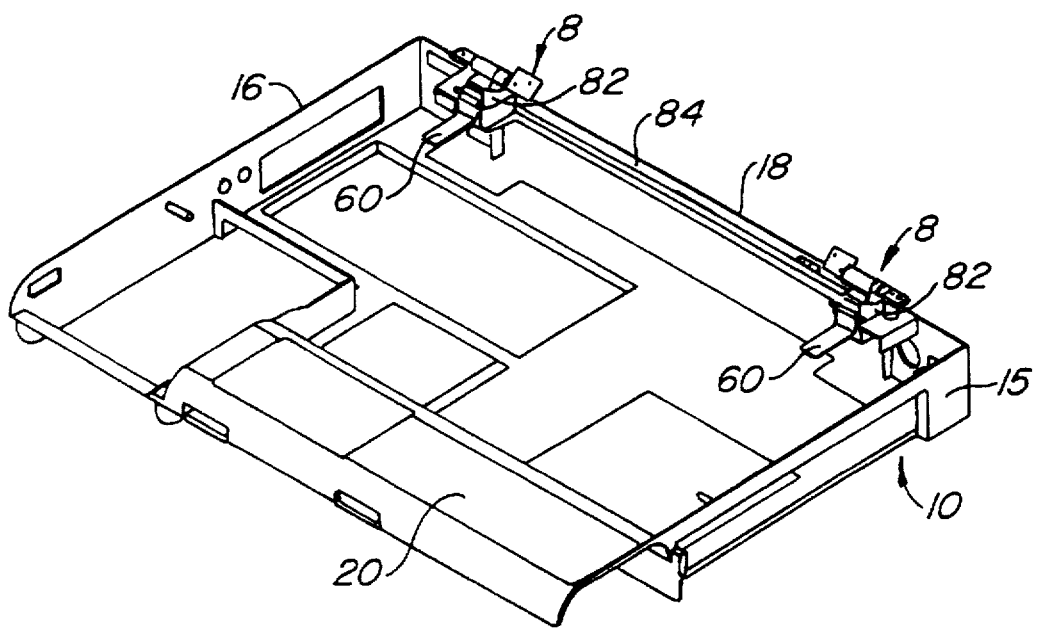
FIG. 7 is an expanded view of the computer in the disabled position.

Referring to FIG. 5, the present invention further includes a mechanism 80 for disabling linkage assembly 8 so that it will not pivot keyboard 6 when lid 12 is opened or closed. In a specific configuration, disabling mechanism 80 comprises a pair of holders 82 coupled to each other by a rod 84 (only one holder 82 is portrayed in FIGS. 5 and 7). Holders 82 each define a slot for receiving a rib 86 protruding from a lower surface of first arm 58 to thereby couple lever 56 to rod 84. Holders 82 and rod 84 are slidably disposed within hollow 19 of housing 10 for translating each lever 56 between a first position (FIG. 3), where cam 68 engages first arm 58, and a second position (FIGS. 6 and 7), where lever 56 is offset so that cam 68 does not engage first arm 58 when cam 68 is rotated with hinge 40. To that end, levers 56 are sized so that they can be translated in a lateral direction (relative to rear wall 18) within recesses 66 of housing 10. Disabling mechanism 80 further includes a user-actuatable, external knob 88 fixed to rod 84 and slidably disposed within an exterior slot 90 in rear wall 18 of housing 10. In this manner, the operator can simply slide knob 88 between ON and OFF positions to disable or enable linkage assembly 8.

Figure 8:
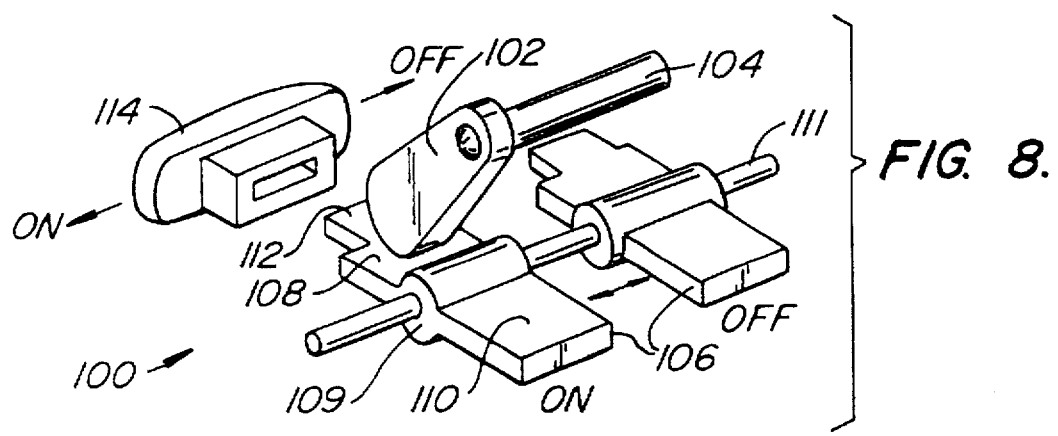
FIG. 8 is a schematic illustration of another embodiment of a linkage assembly and disabling mechanism, illustrating movement of the linkage assembly between ON and OFF positions.

It should be understood that the present invention is not limited to the above described specific embodiment of linkage assembly 8 and disabling mechanism 80. FIGS. 8–11 schematically illustrate alternative embodiments of a linkage assembly and disabling mechanism according to the present invention. In FIG. 8, a linkage assembly 100 comprises a cam 102 attached to a hinge 104 and a lever 106 pivotally coupled to housing 10 (similar to the previous embodiment). In this design, lever 106 is generally planar and comprises two arms 108, 110 connected by a central tube 109. Tube 109 is slidably and pivotally disposed on a shaft 111 that is suitably connected to the housing. One of the arms 108 has an extension 112 that projects through a slot (not shown) in rear wall 18 of housing 10 (see FIG. 5) to engage a knob 114. Knob 114 slides lever 106 along shaft 111 between the ON position, where cam 102 engages arm 108, and the OFF position, where cam 102 does not engage arm 108.

Figure 9:
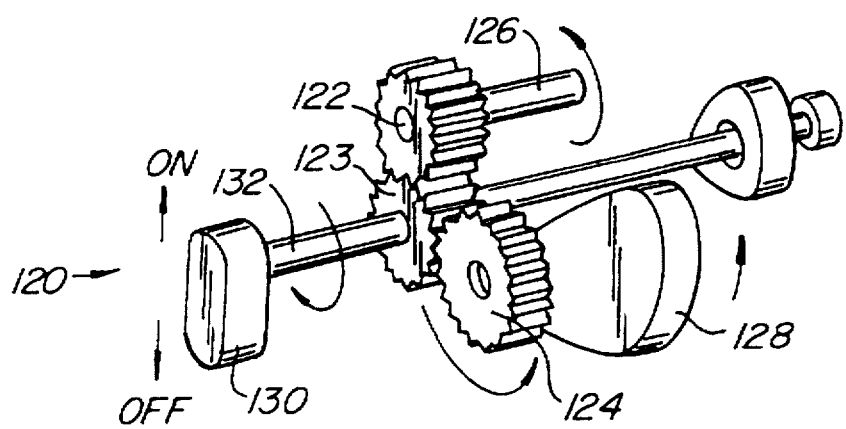
FIGS. 9–11 are schematic illustrations of alternative linkage assemblies incorporating gears, links and an electrical motor, respectively, for tilting the keyboard between the carrying and operating positions.

FIG. 9 illustrates a linkage assembly 120 comprising a number of gears 122–124 that translate the rotation of a hinge 126 into a corresponding rotation of a cam 128. Cam 128 then engages a lever (not shown) to tilt the keyboard similar to the above embodiments. In this embodiment, one of the gears 123 is coupled to an external knob 130 via a rod 132 extending through a sidewall of the computer housing. Knob 130 can be moved in the vertical direction to engage or disengage gear 123 from gear 124, thereby disabling or enabling linkage assembly 120.

Figure 10:
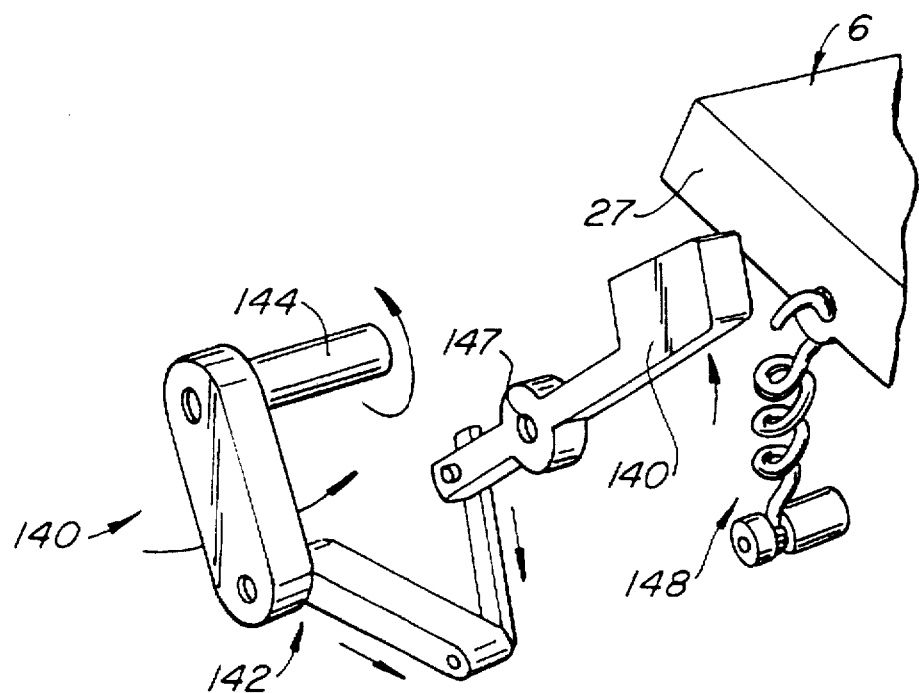

FIG. 10 illustrates a linkage assembly 140 incorporating a four-bar linkage 142 to translate the rotation of a hinge 144 into an upward pivoting motion of a lever arm 146 about a fixed pivot point 147. Lever arm 146, in turn, pivots distal end 27 of keyboard 6 upwards into the operating position. FIG. 10 also illustrates a spring 148 for biasing distal end 27 of keyboard 6 downward into the carrying position.

Figure 11:
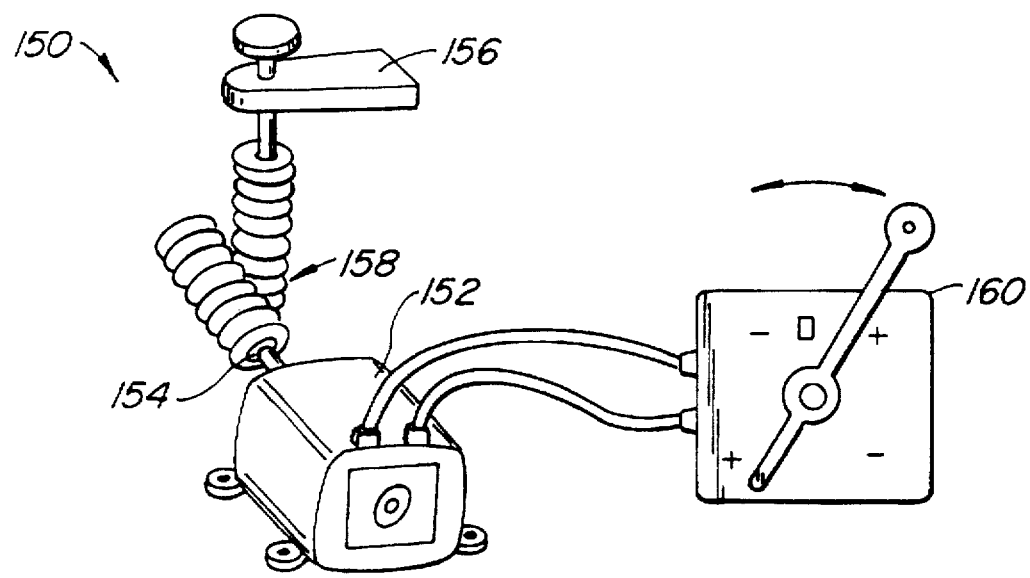

Finally, FIG. 11 illustrates an electrical linkage assembly 150 incorporating a conventional reversible motor 152 coupled to a drive shaft 154. The rotation of shaft 154 is translated to upward movement of a lever arm 156 via a conventional rotation-to-translation gear 158, e.g. a wormgear or rack and pinion gear. Motor 152 can be manually actuated with a switch 160 or the switch 160 can be responsive to movement of lid 12 (shown in FIG. 2) for automatically configuring motor 152 to rotate shaft 154 in a clockwise direction as lid 12 is opened and in a counter-clockwise direction as lid 12 is closed.

Although the foregoing invention has been described in detail for purposes of clarity of understanding, it will be obvious that certain modifications may be practiced within the scope of the appended claims. For example, the linkage assembly of the present invention can be utilized with a variety of conventional and non-conventional portable computers other than the representative computer described above and shown in the figures.

What is claimed is:

1. A portable computer comprising:

a housing having a lid movable between open and closed positions;

a keyboard mounted within the housing, the housing defining a lower support surface;

a linkage coupled to the lid for moving the keyboard between a carrying position, where the keyboard is substantially parallel to the support surface, and an operating position, where the keyboard is inclined relative to the support surface; and a disabling mechanism for disabling the linkage such that the keyboard remains in the carrying position when the lid is moved into the open position;

wherein the linkage is responsive to movement of the lid to move the keyboard towards the operating position as the lid is moved into the open position and to move the keyboard towards the carrying position as the lid is moved into the closed position.

2. The computer of claim 1 wherein the keyboard is inclined downwardly towards the support surface at an angle of 5 to 12 degrees relative to the support surface when the keyboard is in the operation position.

3. The computer of claim 1 wherein the linkage has a first portion coupled to the lid and a second portion coupled to the housing, the first portion cooperating with the second portion to translate rotation of the lid into pivotal movement of the keyboard about an axis parallel to the support surface.

4. The computer of claim 1 wherein the keyboard has proximal and distal ends, the proximal end pivotally coupled to the housing, the computer further comprising means for biasing the distal end of the keyboard towards the housing.

5. The computer of claim 1 wherein the lid comprises a display panel.

6. A portable computer comprising:

a housing having a lid movable between open and closed positions;

a keyboard mounted within the housing, the housing defining a lower support surface;

a linkage coupled to the lid for moving the keyboard between a carrying position, where the keyboard is substantially parallel to the support surface, and an operating position, where the keyboard is inclined relative to the support surface;

wherein the linkage is responsive to movement of the lid to move the keyboard towards the operating position as the lid is moved into the open position and to move the keyboard towards the carrying position as the lid is moved into the closed position;

the housing comprises a hinge, the lid being pivotable about the hinge between the open and closed positions; and wherein the linkage comprises a cam attached to the lid for rotation therewith and a lever pivotally coupled to the main chassis about a pivot pin, the lever having first and second arms.

7. The computer of claim 6 wherein the first and second lever arms have first and second camming surfaces, respectively, the first lever arm being positioned to engage the cam with the first camming surface such that rotation of the cam pivots the first and second lever arms about the pivot pin.

8. The computer of claim 7 wherein the keyboard comprises a main body, a key surface and an opposing non-key surface, the second lever arm being positioned to engage the non-key surface with the second camming surface such that the second lever arm moves the keyboard towards the operating position when the hinge rotates the cam.

9. The computer of claim 7 wherein the linkage comprises a second cam attached to the lid for rotation therewith and a second lever pivotally coupled to the main chassis for moving the keyboard between the carrying and operating positions.

10. The computer of claim 7 wherein the disabling means comprises means for moving the lever between a first position, where the first lever arm is positioned to engage the cam as the cam is rotated about the hinge, and a second position, where the first lever arm is offset from the cam so that the cam will not engage the first lever arm as the cam is rotated about the hinge.

11. The computer of claim 10 wherein the lever is slidably coupled to the main chassis, the moving means comprising a user-actuatable knob movably mounted to the main chassis and coupled to the lever for translating the lever between the first and second positions.

12. A portable computer comprising:

a housing having a lid movable between open and closed positions;

a keyboard mounted within the housing, the housing having a lower support surface;

means, operatively coupled to the keyboard, for inclining the keyboard relative to the support surface as the lid is moved into the open position; and a disabling mechanism, coupled to the housing, for disabling the inclining means such that the keyboard remains substantially parallel to the support surface as the lid is moved between the open and closed positions.

13. The computer of claim 12 wherein the inclining means comprises a linkage for pivoting the keyboard between a carrying position, where the keyboard is substantially parallel to the support surface, and a operating position, where the keyboard is downwardly sloped towards the support surface.

14. The computer of claim 13 wherein the linkage is responsive to movement of the lid to move the keyboard into the operating position as the lid is moved into the open position and to move the keyboard into the carrying position as the lid is moved into the closed position.

15. The computer of claim 14 wherein the linkage has a first portion coupled to the lid and a second portion coupled to the housing, the first portion cooperating with the second portion to translate rotation of the lid into pivotal movement of the keyboard relative to the support surface.

16. The computer of claim 15 wherein the disabling mechanism comprises a knob and a coupling movably mounted to the housing, the coupling connecting the knob with the second portion of the linkage to move the second portion between a ON position, where the second portion is aligned with the first portion, and an OFF position, where the second portion is not aligned with the first portion.

17. A method for operating a portable computer comprising:

providing a housing having a lid, a keyboard and a lower support surface;

moving the lid from a closed position overlying the housing to an open position;

pivoting the keyboard, in response to motion of the lid, from a carrying position, where the keyboard is substantially parallel to the support surface, and an operating position, where the keyboard is inclined relative to the support surface; and disabling the linkage such that the keyboard remains in the carrying position when the lid is opened.

18. The method of claim 17 wherein the pivoting step comprises pivoting the keyboard to a downward angle of 5 to 12 degrees relative to the support surface.

19. The method of claim 17 further comprising:

closing the lid; and pivoting the keyboard in response to motion of the lid from the operating position to the carrying position with the linkage.

20. The method of claim 17 wherein the pivoting step comprises:

actuating a linkage coupled to the lid; and pivoting the keyboard into the operating position with the linkage.

21. The method of claim 20 wherein the actuating step comprises:

pivoting the lid about a hinge coupling the lid to the housing;

rotating a cam attached to the hinge;

engaging a first arm of a lever with the cam; and rotating the lever about a pivot.

22. The method of claim 17 wherein the pivoting step comprises:

engaging a non-key surface of the keyboard with a second arm of the lever; and pivoting the keyboard into the inclined position with the second arm of the lever.

23. The method of claim 22 wherein the disabling step comprises moving the linkage from a first position, where the first lever arm is positioned to engage the cam as the cam is rotated about the hinge, and a second position, where the first lever arm is offset from the cam so that the cam does not engage the first lever arm as the cam is rotated about the hinge.

* * * * *